US012077384B2

(12) United States Patent
Mutarelli et al.

(10) Patent No.: US 12,077,384 B2
(45) Date of Patent: Sep. 3, 2024

(54) SYSTEMS AND METHODS FOR HIGH-SPEED WAREHOUSE ORDER SORTATION

(71) Applicant: Target Brands, Inc., Minneapolis, MN (US)

(72) Inventors: Gervasio Mutarelli, Minneapolis, MN (US); Carlos Loza, Minneapolis, MN (US); Ernesto Saldana Pena, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 701 days.

(21) Appl. No.: 17/328,480

(22) Filed: May 24, 2021

(65) Prior Publication Data
US 2021/0371204 A1 Dec. 2, 2021

Related U.S. Application Data

(60) Provisional application No. 63/029,803, filed on May 26, 2020.

(51) Int. Cl.
*G06F 7/00* (2006.01)
*B60L 13/03* (2006.01)
(Continued)

(52) U.S. Cl.
CPC ............ *B65G 1/1376* (2013.01); *B60L 13/03* (2013.01); *B60L 13/04* (2013.01); *B65G 1/0492* (2013.01);
(Continued)

(58) Field of Classification Search
CPC .. B65G 1/1376; B65G 1/0492; B65G 1/1371; B65G 1/1373; B65G 54/02;
(Continued)

(56) References Cited

U.S. PATENT DOCUMENTS 3,771,679 A * 11/1973 Theml ................. B65G 1/1376
414/807
8,170,712 B2 5/2012 Battles et al.
(Continued)

FOREIGN PATENT DOCUMENTS

WO WO-2014161709 A1 * 10/2014 ........... B65G 1/0485
WO WO 2017/102315 6/2017

OTHER PUBLICATIONS

MagnetMotion, [online], "MagneMotion's MagneMover Lite Intelligent Conveyor System," posted Apr. 6, 2012, retrieved on May 24, 2021, <https://www.youtube.com/watch?app=desktop&v=qrFlOECiot0&form=MY01SV&OCID=MY01SV>, 1 page [Video Submission].
(Continued)

*Primary Examiner* — Yolanda R Cumbess
(74) *Attorney, Agent, or Firm* — Fish & Richardson P.C.

(57) ABSTRACT

Warehouse automation and methods of automatically sorting and sequencing items can be implemented to streamline and expedite order fulfillment and store replenishment processes in a cost-effective manner. Some embodiments described herein include: (i) picking or retrieving items from an inventory storage area, (ii) decanting individual items and placing them on carriers of a high-speed sorting and conveyance system, and (iii) final sortation as per customer orders. In some embodiments, the high-speed sorting and conveyance system includes multiple shuttles that each carry an individual item to a designated final order sortation system.

20 Claims, 8 Drawing Sheets

(51) Int. Cl.
*B60L 13/04* (2006.01)
*B65G 1/04* (2006.01)
*B65G 1/137* (2006.01)
*B65G 54/02* (2006.01)
*B61B 13/02* (2006.01)

(52) U.S. Cl.
CPC ......... *B65G 1/1371* (2013.01); *B65G 1/1373* (2013.01); *B65G 54/02* (2013.01); *B60L 2200/26* (2013.01); *B60L 2200/44* (2013.01); *B60L 2240/62* (2013.01); *B60L 2240/70* (2013.01); *B61B 13/02* (2013.01); *B65G 1/0407* (2013.01); *B65G 2203/0283* (2013.01); *B65G 2209/04* (2013.01); *B65G 2811/095* (2013.01)

(58) Field of Classification Search
CPC .......... B65G 1/0407; B65G 2203/0283; B65G 2209/04; B65G 2811/095; B65G 1/1378; B65G 1/0485; B60L 13/03; B60L 13/04; B60L 2200/26; B60L 2200/44; B60L 2240/62; B60L 2240/70; B61B 13/02; Y02P 90/60; Y02T 10/72; Y02T 90/16

USPC ................. 700/216, 223–224, 226, 228–230
See application file for complete search history.

(56) References Cited

U.S. PATENT DOCUMENTS

| | | | |
|---|---|---|---|
| 8,952,284 B1* | 2/2015 | Wong | G05B 15/02 |
| | | | 209/586 |
| 9,008,831 B1 | 4/2015 | Jacobs et al. | |
| 10,106,330 B2 | 10/2018 | Maines et al. | |
| 2020/0324974 A1* | 10/2020 | Gorman | G06V 10/22 |
| 2020/0407178 A1* | 12/2020 | Battles | B65G 1/0478 |
| 2021/0371205 A1 | 12/2021 | Mutarelli et al. | |

OTHER PUBLICATIONS

Opex Corporation, [online], "The Small Item Sorting System—Sure Sort™," posted Apr. 4, 2017, retrieved on May 24, 2021, <https://www.youtube.com/watch?app=desktop&v=qSlKIiDhPuw&form=MY01SV&OCID=MY01SV>, 1 page [Video Submission].

* cited by examiner

SYSTEMS AND METHODS FOR HIGH-SPEED WAREHOUSE ORDER SORTATION

CROSS-REFERENCE TO RELATED APPLICATIONS

This application claims the benefit of U.S. Provisional Application Ser. No. 63/029,803, filed May 26, 2020. The disclosure of the prior application is considered part of (and is incorporated by reference in) the disclosure of this application.

TECHNICAL FIELD

This document relates to systems and methods for enhancing efficiencies of order fulfillment processes. For example, this document relates to warehouse automation and methods of automatically sorting items at a high speed to streamline order fulfillment and store replenishment processes.

BACKGROUND

The order fulfillment process refers to all the steps that companies take from the moment they receive a customer order (which can include an order that is wholly or partly internal to the company, such as a store replenishment order) to the moment that the items are landed in customers' hands. Such steps can include, for example: the order is sent to the warehouse; order sortation (e.g., a worker goes into the warehouse, finds the items in the order, and picks the items off the warehouse shelf); the order is packed for shipping; and the order is shipped.

The use of warehouse automation is one way to increase the efficiency of an order fulfillment process. The goal of warehouse automation is to cut out manual steps of the order fulfillment process, to help reduce the occurrences of human error and to make processes more efficient. Two-day deliveries of shipments for direct to customer orders are currently standard, and customers are often willing to pay extra for same-day or next-day deliveries. The goal for retail store replenishment orders is often 24 hours or less. Highly efficient warehousing, order sortation, and shipping processes are on the frontline of meeting these high level of customer expectations.

SUMMARY

This document describes systems and methods for enhancing efficiencies of order fulfillment processes. For example, this document describes warehouse automation and methods of automatically sorting items at a high speed to streamline order fulfillment and store replenishment processes. For example, in some embodiments the systems and methods described herein include: (i) picking items from an inventory storage area, (ii) decanting individual items and placing them on carriers of a high speed sorting and conveyance system, and (iii) final sortation as per customer orders.

In one aspect, this disclosure is directed to automated systems and methods for sorting items for shipments. In one such example, a warehouse system for sorting items to fulfill orders includes a conveyance system, a first automated order sortation system, and a control system in data communication with the conveyance system and the first automated order sortation system. The conveyance system includes a plurality of shuttles configured to receive and transport individual items of the items, and a track defining a plurality of pathways along which the plurality of shuttles controllably travel. Each shuttle of the plurality of shuttles controllably travels along the pathways independently of all other shuttles of the plurality of shuttles. The first automated order sortation system is arranged to receive at least some of the individual items and configured to aggregate the at least some of the individual items into one or more groups in accordance with the orders. The control system is configured to send control signals to the conveyance system to cause each shuttle of the plurality of shuttles to travel along the plurality of pathways in a manner based on a type of individual item of the items that each shuttle of the plurality of shuttles is transporting.

Such a warehouse system for sorting items to fulfill orders may optionally include one or more of the following features. The system may also include a second automated order sortation system arranged to receive at least some of the individual items and configured to aggregate the at least some of the individual items into one or more groups in accordance with the orders. The control system may be configured to send control signals to the conveyance system to cause a first shuttle of the plurality of shuttles to travel along the pathways to the first automated order sortation system because the first shuttle is transporting a first item that is allocated for a first order that the first automated order sortation system is assigned to fulfill. The control system may be configured to send control signals to the conveyance system to cause a second shuttle of the plurality of shuttles to travel along the pathways to the second automated order sortation system because the second shuttle is transporting a second item that is allocated for a second order that the second automated order sortation system is assigned to fulfill. The system may also include a manual order sortation system arranged to receive at least some of the individual items and configured for manual aggregation of the at least some of the individual items into one or more groups in accordance with the orders. The control system may be configured to send control signals to the conveyance system to cause a third shuttle of the plurality of shuttles to travel along the pathways to the manual order sortation system because the third shuttle is transporting a third item that is allocated for a third order that the manual order sortation system is assigned to fulfill. The control system may include: (i) an order fulfillment control system and (ii) a control system of the conveyance system. The manner based on the type of individual item of the items that each shuttle of the plurality of shuttles is transporting may include a particular pathway of the plurality of pathways. The manner based on the type of individual item of the items that each shuttle of the plurality of shuttles is transporting may also include a temporary stoppage of travel in order to sequence the items based on the orders. In some embodiments, the track comprises a linear servomotor. The conveyance system may also include sensors or encoders arranged along the pathway and configured to detect respective positions along the pathway of each shuttle of the plurality of shuttles. The control system may be configured to receive signals output from the sensors or encoders and to determine the respective positions along the pathway of each shuttle of the plurality of shuttles based on the signals. The system may also include an automated system for automatically transferring the least some of the individual items to the first automated order sortation system from the conveyance system.

In another aspect, this disclosure is directed to a method of sorting items to fulfill orders. The method includes: (i)

picking or retrieving, from inventory storage, a plurality of items that are allocated for a plurality of orders; and (ii) decanting the plurality of items and placing individual items of the plurality of items on individual shuttles of a conveyance system that includes a plurality of shuttles. The individual shuttles transport respective individual items to a particular final order sortation system of a plurality of final order sortation systems because the particular final order sortation system is processing one or more orders that include the respective individual items.

Such a method of sorting items to fulfill orders may optionally include one or more of the following features. The respective individual items may be automatically transferred to the particular final order sortation system. The individual shuttles may controllably travel along the pathways independently of all other shuttles of the plurality of shuttles. The individual shuttles may controllably travel along the pathways in accordance with a unique pattern of motion in comparison to all other shuttles of the plurality of shuttles. The unique pattern of motion may include a pattern of starting and stopping motion. The unique pattern of motion may include an acceleration and deceleration profile. The plurality of final order sortation systems may include at least one automated order sortation system and at least one manual order sortation system.

The systems, methods, and processes described herein may be used to provide one or more of the following optional benefits. First, some embodiments provide an order fulfillment process that is more responsive and agile so that orders can be shipped to internal and external customers in a shorter timeframe than current processes. In particular, the automated systems, methods, and processes described herein provide the potential for order sortation at a high rate of speed (e.g., units per hour) in comparison to conventional warehouse sorting systems, methods, and processes for outbound shipments.

Second, some embodiments described herein simplify the conventionally manual process of item induction/decanting by transferring steps of the process to the automated conveyance systems described herein. For example, the number of "touches" of items by human workers during the order fulfillment process are reduced. In addition, the frequency of item barcode scanning and item labeling can also be advantageously reduced. Moreover, the need for returning empty transfer containers (e.g., totes) from the end of the process back to the induction/decanting stations can also be reduced, or eliminated altogether. Such improvements can potentially reduce VCPU ("Variable Cost per Unit"). In addition, worker's productivity is increased through better allocation and increased automation.

Third, the accuracy of order fulfillment processes can be enhanced by eliminating human errors by using the automated systems, methods, and processes described herein. For example, automation can be controlled to accurately transport items that are inducted to designated final sortation lines. The systems described herein facilitate product traceability, from the moment the items are inducted, so that all items are tracked and locatable within the order fulfillment system. Error reduction can also reduce overall costs associated with the order fulfillment processes.

Fourth, warehouse space requirements can be reduced by using the automated systems, methods, and processes described herein. Moreover, the systems described herein are modular, scalable, flexible, and relatively easy to implement. Further, the automated conveyance and sortation systems described herein are designed to have redundancy such that an equipment failure (e.g., a jam, etc.) in one area can be readily bypassed by simply routing the conveyance carriers along an alternative, redundant path.

Fifth, the equipment required for sorting and sequencing the items for shipment as described can be commercially obtained and then specially adapted or customized for use as described herein.

Sixth, the systems, methods and processes described herein can advantageously improve and/or alleviate constraints from the process of operating automatic sortation systems. That is, automatic induction of items at a high rate of speed is facilitated using the systems and methods described herein. Accordingly, the common bottle neck of manual induction to automatic sortation systems can be alleviated, and the automatic sortation systems can then be operated at or near full speed/capacity.

Seventh, the automated conveyance and sortation systems described herein facilitate full traceability of each individual product/item as the product/item is being handled by the automated conveyance and sortation systems. Such traceability is beneficial from a process control and operations standpoint.

Other features, aspects, and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes. For example, this document describes warehouse automation and methods of automatically sorting items at a high speed to streamline order fulfillment and store replenishment processes. Such systems and methods can be used for the daily replenishment and movement of inventory generated from real-time demand singles for in-store retail sales and/or direct-to-guest on-line sales fulfilled from a multi-echelon inventory-holding model at the correct unit of measure, using fast and easy material handling equipment that will create operational efficiency at every process step in the supply chain. Said another way, this document describes warehouse automation and methods of efficiently controlling material flow to streamline order fulfillment processes (which can include, for example, orders for direct shipments to consumers, orders that are wholly or partly internal to the company such as store replenishment orders, and/or other like order fulfillment processes).

Figure 1:
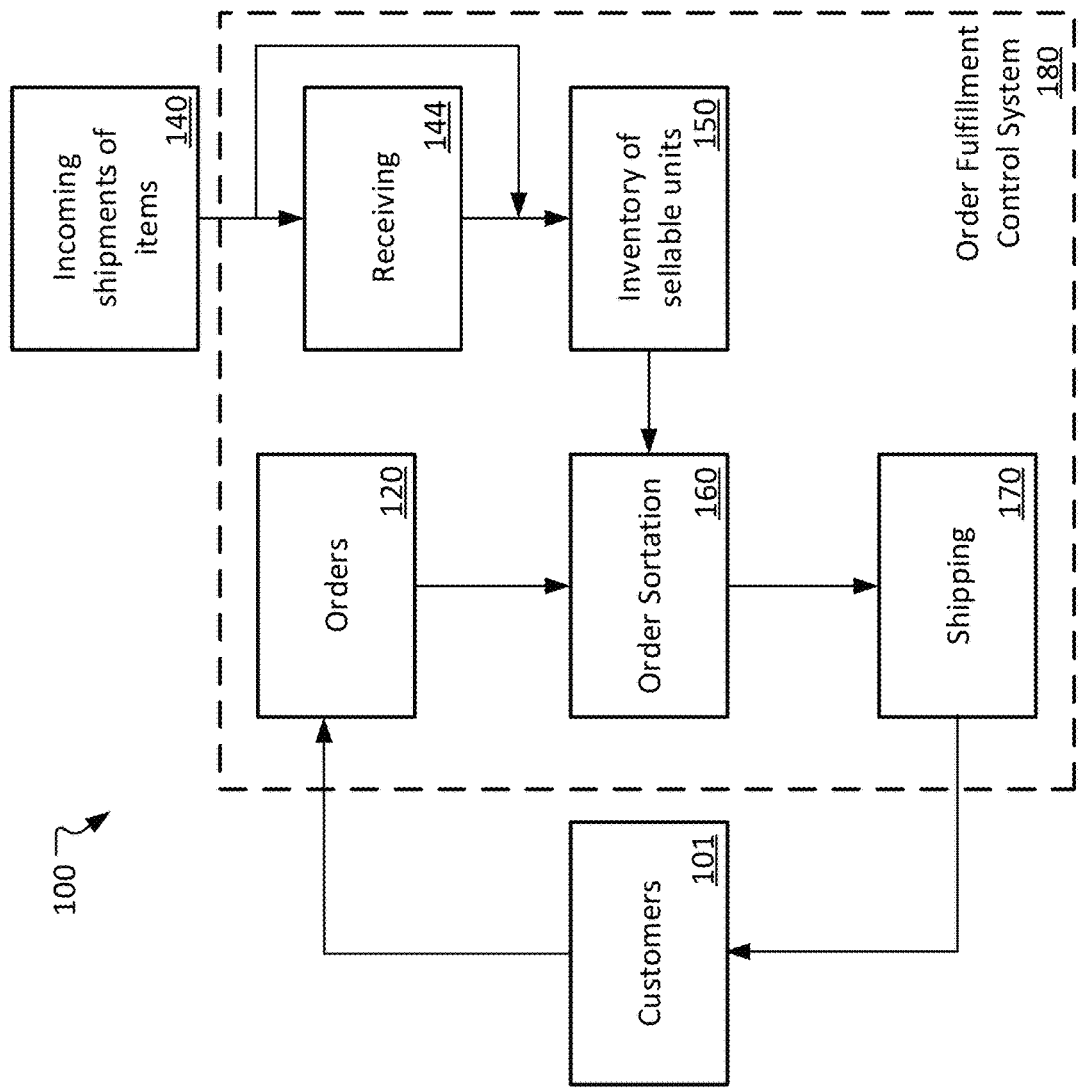
FIG. 1 is a highly simplified schematic diagram of a basic order fulfillment process.

FIG. 1 depicts an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "flow center" (or simply "warehouse") may be used to refer to any and all such different types of facilities, and combinations thereof. In some examples, the order fulfillment process 100 takes place at a single facility. Alternatively, in some examples execution of the order fulfillment process 100 is distributed across two or more facilities. A flow center as described herein can be a portion of a multi-echelon supply chain, and can include food distribution centers.

The flow of sellable items within the overall order fulfillment process 100 is driven by demand for those sellable items from customers 101. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 101. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in a timely and accurate manner. However, the scope of the order fulfillment process 100 also includes partial shipments that do not include all of the items included in an order 120.

The orders 120 are entered into an order fulfillment control system 180 (represented in FIG. 1 by the dashed-line boundary). In some examples, the order fulfillment control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the order fulfillment control system 180 (or simply "control system 180") can, in some cases, broadly encompass multiple systems that can be situated locally, remotely, or situated both locally and remotely. The control system 180 can include hardware, software, user-interfaces, and so on. For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of items 140 arrive at the flow center. In some cases, the incoming shipments of items 140 are processed by receiving 144 (e.g., the performance of inspections, quantity confirmations/reconciliations, inventory/order control system transactions, etc.). Afterwards, the items enter into inventory 150 of the flow center as sellable units. In some cases, some incoming items go directly from receiving 144 into inventory 150 (e.g., if the incoming items were transferred in from an affiliated facility at which the items were already in the inventory system). The types and quantities of the incoming items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable units in inventory 150 can be located in various types of storage accommodations or transport vessels, such as racks, shelves, containers, vessels, carts, bins, totes, pallet lanes, and the like. Such storage accommodations or transport vessels can be individually identified and tracked by the control system 180. That is, the control system 180 can be used to keep track of the quantities in stock of the various sellable items in the inventory 150 and of the inventory location(s) of the various sellable items in the inventory 150. The sellable items in the inventory 150 can be stored in various receptacles such as, but not limited to, boxes, totes, pallets, baskets, bins, bags, and the like.

Next, in the step of order sortation 160, the sellable item(s) included in the customer order 120 are compiled in preparation for shipment to the respective customer 101. To fulfill the customer orders 120, the one or more items specified in each order may be retrieved, or picked, from inventory 150. Picked sellable items may be delivered or conveyed to one or more areas in the flow center for sorting and assembling into one or more outbound shipping containers for the fulfillment of a respective customer order 120. Outbound shipping containers containing the ordered sellable items are then transported to customers 101 at the step of shipping 170.

FIG. 1 and the foregoing description of the order fulfillment process 100 has provided a high-level overview of the operations of an order fulfillment center. Next, in the following figures and description pertaining thereto, order sortation systems and methods will be described in detail.

Figure 2:
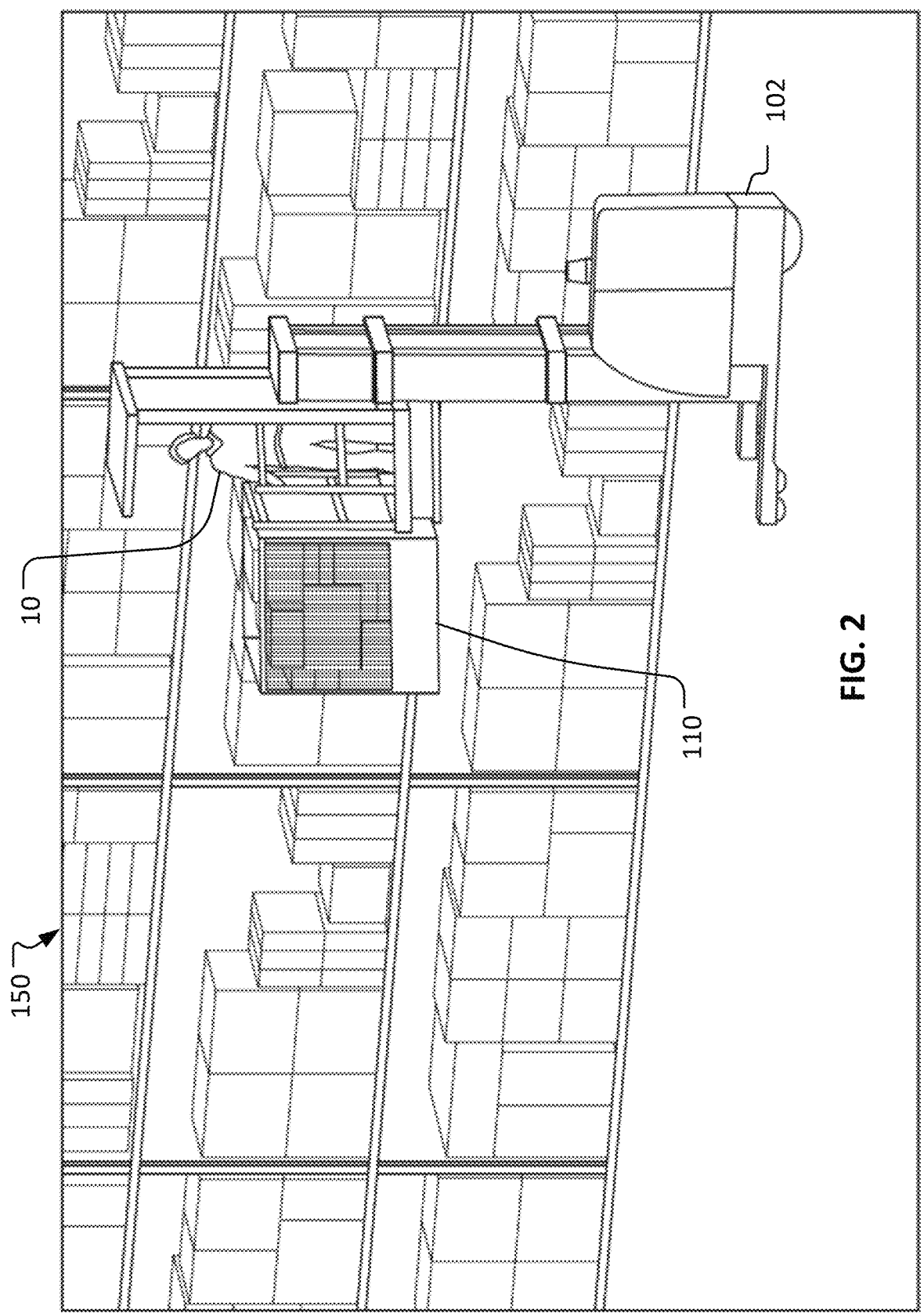
FIG. 2 depicts a warehouse item picking process for an order sortation process.

FIG. 2 depicts a human worker 10 operating an order picker 102 in a warehouse to execute an order picking process, which is one of the first steps of the order fulfillment process. While the depicted order picking process is mostly a manual operation, in some cases the order picking process is semi-automated or fully autonomous (e.g., using one or more robots, an automatic storage and retrieval system (ASRS), and the like). It should be appreciated that all such techniques and systems for order picking are within the scope of this disclosure, and that the depicted process is simply an example order picking process.

To execute such an order picking process, the worker 10 transfers one or more ordered items from the inventory 150 (e.g., warehouse racks, shelving, flow-through pallet racks, etc.) to a cargo holder 110 that is engaged with the order picker 102. In this depicted example, the cargo holder is a cage cart 110. In some embodiments, the cage cart 110 includes casters so that the cage cart 110 can be rolled around like a cart. The cage cart 110 is simply one example of an item transport container, and all other types of transport containers (e.g., totes, boxes, pallets, bins, carts, rolling racks, etc.) are also within the scope of the disclosure.

Typically, an order management system (e.g., the order fulfillment control system 180) provides instructions to the worker 10 regarding what item(s) to pick (in particular quantities), and the inventory locations from which to pick the item(s). The picked items may be for the fulfillment of an ecommerce order, store replenishment order, inventory transfer order, or any other type of order or inventory transfer instruction, and items for a variety of such orders can be picked in a consolidated fashion. The worker 10 generally picks a group of items at a time from inventory 150, following a route up and down each aisle of the warehouse until the entire order is picked. The order picking instructions will typically list the items to be picked in the same sequence that the items are located along the picking flow path. The order picking instructions will list the appropriate quantity of each of the items to fulfill the orders (without extras that would require return to inventory 150). During the picking process, the worker 10 will sometimes use a bar-code scanner to wand-in a bar code of the items to confirm those items have been picked and put into the cage cart 110.

When all of the items of the order being picked by the worker 10 have been picked/transferred into the cage cart 110, or when the cage cart 110 is full, the worker 10 will then drive the order picker 102 to another area of the warehouse to drop off the cage cart 110. Next, the worker 10 will drive the order picker 102 to pick up an empty cage cart 110. Then, the worker 10 will drive the order picker 102 that is engaged with the empty cage cart 110 back to the racking/shelving area of inventory 150 to begin the picking process for other orders.

In accordance with the order sortation processes described herein, when all of the items of the order being picked by the worker 10 have been picked/transferred into the cage cart 110, or when the cage cart 110 is full, the worker 10 will then drive the order picker 102 to the decantation process area to drop off the cage cart 110.

Figure 3:
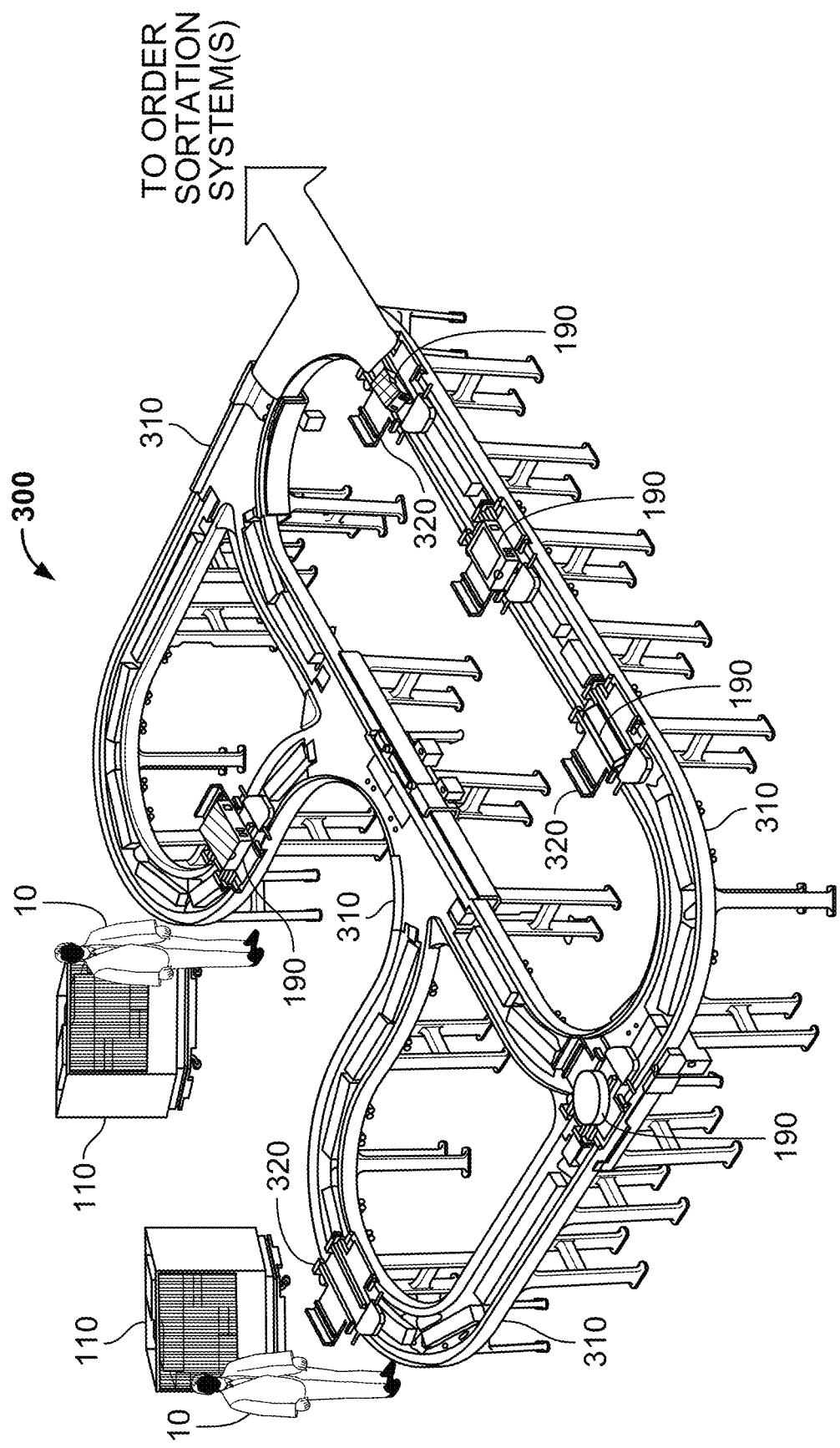
FIG. 3 is a perspective view of an example decanting and high speed item sorting and conveying system.

FIG. 3 depicts an example decantation process and item sorting and conveying system 300 (or simply "conveying system 300" hereafter). The cage carts 110 from the order picking process (as described above in reference to FIG. 2) can be delivered here and staged for decantation (e.g., the input of individual items or saleable units from the cage carts 110 onto the conveying system 300). In some cases, the items from the order picking process are pre-sorted prior to arrival at the conveying system 300. For example, in some cases the items from the order picking process can be pre-sorted in accordance with factors such as, but not limited to, weight, size, destination (internal and/or external), and so on. Such a pre-sort process can be manual, semi-automatic, or automatic.

The conveying system 300 includes a track 310 and a plurality of shuttles 320 that travel along the track 310 in an individualized controlled manner while carrying items 190. Each shuttle 320 carries a single item 190. In some cases, two or more shuttles 320 (e.g., two shuttles 320, three shuttles 320, four shuttles 320, etc.) can be ganged together to operate unitarily so that the ganged shuttles 320 can transport larger and/or heavier single items 190 than what a single shuttle 320 can transport.

The workers 10 transfer the items 190 from the cage carts 110 to the shuttles 320 on an individual item-by-item basis (this is decantation). That is, the workers 10 can load single items 190 (or a single saleable bundle of a multiple number of the items) onto single shuttles 320 (or onto multiple shuttles 320 that work together like a unitary shuttle 320). In some scenarios, the workers 10 will break a case of items 190 apart and place individual items 190 from the case onto single shuttles 320. In some scenarios, a case of the items 190 (or other bundle of multiple items 190) are placed onto single shuttles 320 without breaking the case apart.

After an item 190 has been loaded onto a shuttle 320 by the worker 10, the worker 10 can scan a barcode on the item 190 and a barcode on the shuttle 320 (each shuttle 320 can have a unique identifier/barcode). In some cases, other types of identifiers can be used, such as RFID tags and the like.

Using the scanned barcode data, the control system of the conveying system 300, or the order fulfillment control system 180 (or other type of control system) will map (or "marry") the item 190 to the shuttle 320. Accordingly, a control system (e.g., the control system of the conveying system 300, the order fulfillment control system 180, or both) will know/trace what particular type of item 190 is on each particular shuttle 320. This information will be used by the control system to determine and control to which final sort line the items 190 will be automatically moved to via the shuttles 320 of the item conveying system 300, as described further herein.

Much more so than a typical warehouse conveying system, the conveying system 300 is a "smart" system. That is, the conveying system 300 (in conjunction with its control system(s)) has many automatic operational functionalities that are not typically found in a conventional conveyor system. First, the conveyance of the shuttles 320 along the track 310 are discretely controlled and tracked on an individual basis. In some embodiments, this is accomplished at least in part because the conveying system 300 comprises a linear servomotor with encoders and/or other types of sensors. In such a case, localized segments of the track 310 can be sequentially energized and de-energized to create progressive electromagnetic fields that causes conveyance of an individual shuttle 320 along the track in the manner desired (e.g., at a desired acceleration, top speed, pathway, position, etc.). While the conveying system 300 includes multiple shuttles 320 moving along the track 310 simultaneously, the movements (e.g., acceleration, speed, path, position, deceleration, spacing, etc.) of each of the shuttles 320 is controlled on an individual basis. In this manner, the conveying system 300 is a smart system, because each shuttle 320 is controlled in a highly individualized manner. In some cases, two or more of the shuttles 320 can be ganged together to operate jointly in a unified, individualized manner. This mode/manner can be especially useful for transporting large or heavy items 190 (or cases of items 190, and the like).

In some cases, the conveying system 300 can be used in conjunction with other, more conventional conveyor systems or other material handling systems. For example, long runs can be made from conventional conveyor systems that will tend to be lower cost than a long run of the linear servomotor design of the conveying system 300. Items can be transferred between the conveying system 300 and conventional conveyors using various systems such as, but not limited to, pick-and-place devices, robotic devices with vision systems, simple tilt trays, transfer belts, and the like, without limitation.

Also, it should be noted that the conveying system 300 is a high-speed system. The fact that the conveying system 300 comprises a linear servomotor system allows the shuttles 320 (with the items 190 carried on the shuttles 320) to be moved with very rapid acceleration, top speed, and deceleration in a smooth and controlled manner. The movement parameters can be individualized for each shuttle 320, and can be dependent on the type of items 190 carried by the shuttles 320.

Second, the control system(s) of the item conveying system 300 stores data and refreshes the stored data such that the item conveying system 300 knows and controls the location of each shuttle 320 on the item conveying system 300 on an individualized basis. This can also be referred to as item "traceability." The control system of the item conveying system 300 tracks where on the item conveying system 300 each individual shuttle 320 is located whether the shuttle 320 is being moved or is being held stationary.

Third, the control system(s) of the item conveying system 300 (or another control system such as a warehouse management system) determines where along the item conveying system 300 that each of the unique shuttles 320 is to be directed (e.g., the path), and the designated final destination of each of the shuttles 320 (based on the item 190 being carried by the shuttle 320). The control system of the item conveying system 300 may communicate with one or more other systems (e.g., the order fulfillment control system 180) to obtain and/or determine such information. For example, as described further below, the overall order fulfillment system of the warehouse may include multiple final sortation systems. The control system of the item conveying system 300 is made aware of or determines which particular final sortation system of the multiple final sortation systems that each of the shuttles 320 is to be moved to (based on the item 190 being carried by the shuttle 320), and controls the movements of each of the shuttles 320 accordingly. In this manner, the item conveying system 300 can automatically sort items 190 (e.g., by moving certain items 190 to a first final sortation system and by moving other items 190 to a second final sortation system).

Fourth, the item conveying system 300 can intelligently sequence the movements and delivery timing/order of each of the shuttles 320 that are on the item conveying system 300 (based on the item 190 being carried by the shuttle 320). For example, in some cases certain items 190 may be designated as having a higher priority to reach the final destination (e.g., sortation system) prior to other lower priority items 190. This prioritization feature can also facilitate re-routing items 190 from a sortation system that is down to another sortation system that is running and requires the same specific items 190 to complete an order. In some embodiments, the control system of the item conveying system 300 may receive such information from the order fulfillment control system 180 (or another system). Because the track 310 of the item conveying system 300 includes various alternate paths, branches and/or loops, the item conveying system 300 can temporarily buffer (hold in temporary storage) certain lower priority items 190 until the higher priority items 190 have been moved in front of the lower priority items 190. In this manner, the item conveying system 300 can automatically sequence items 190.

The fact that the track 310 of the item conveying system 300 includes various alternate paths, branches and/or loops also provides an inherent redundancy in the event of a failure of a particular portion of the track 310. For example, if a particular portion of the track 310 is jammed or otherwise inoperable, the conveying system 300 can automatically identify a route for the items 190 to travel that bypasses the inoperable portion of the track. Accordingly, downtime of the item conveying system 300 is minimized. Scheduled maintenance can also be performed on portions of the item conveying system 300 without entirely shutting down the item conveying system 300.

In accordance with the above description, it should be understood that the item conveying system 300 is an automatic sortation system, sequencing system, and conveyance system which is capable of operating at high speeds. The item conveying system 300 is scalable/expandable, configurable, flexible, modular, and automatic. The use of the item conveying system 300 as described herein greatly increases throughput speed and reduces human labor requirements in comparison to conventional techniques for decanting, binning, labeling, and so on. The throughput of the item conveying system 300 can also be selectively controlled by adjusting parameters of the item conveying system 300 such as, but not limited to, the speed of the shuttles 320, the number of shuttles 320, and the like.

Figure 4:
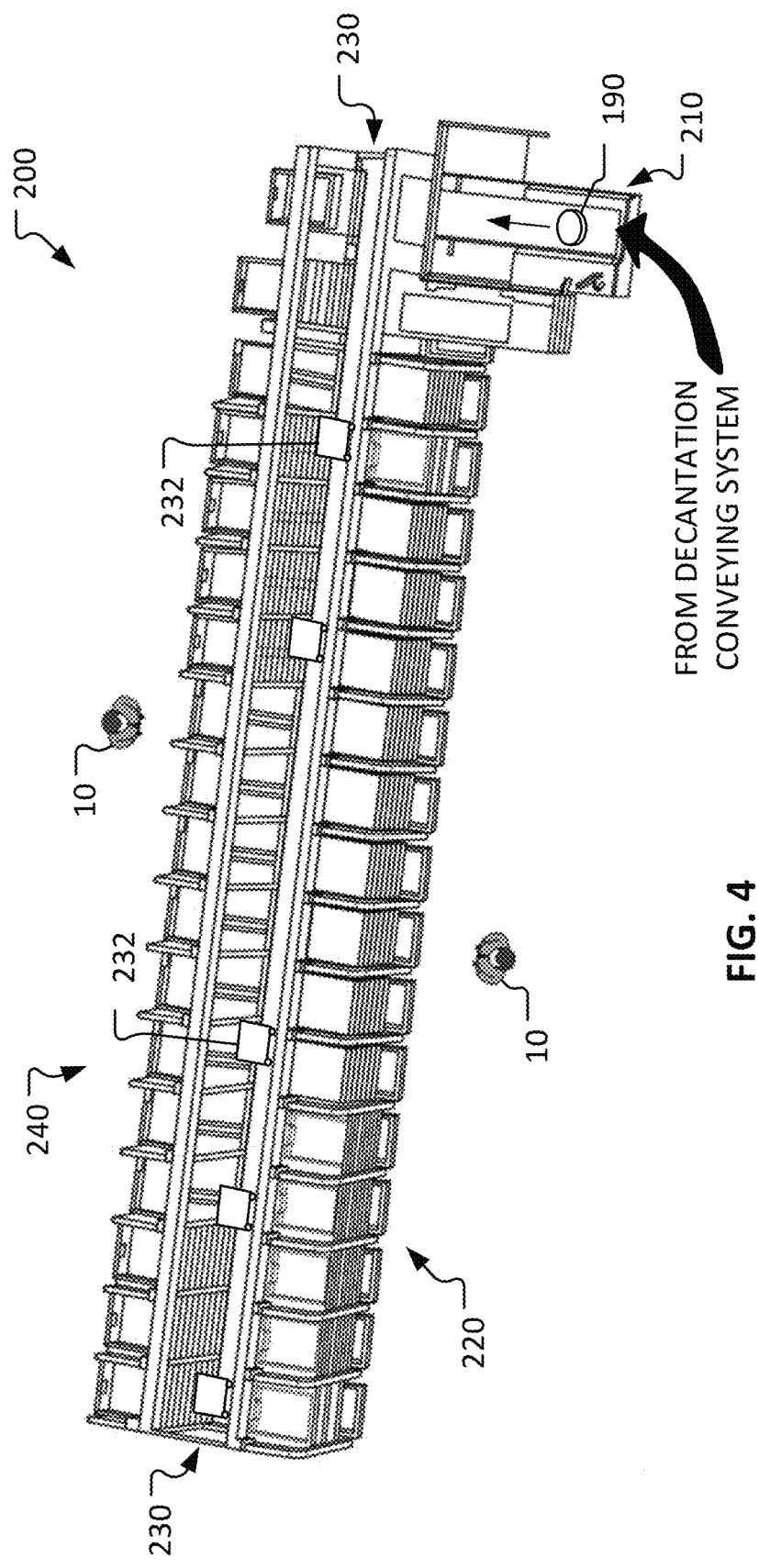
FIG. 4 is a perspective view of an example automated final sortation system.

Referring also to FIG. 4, an example automatic final order sortation system 200 can be used to efficiently sort a large quantity of a variety of different types of items 190 into the proper combinations of line items to fulfill multiple individual orders. The automatic order sortation system 200 includes a matrix of receptacle stations 220. The matrix of receptacle stations 220 is a long multi-level matrix, and can contain a high number of receptacles. It should be understood that the automatic final order sortation system 200 is simply one illustrative example of a sortation system that can be used in conjunction with the item conveying system 300. Many other types of sortation systems can also be advantageously used with the item conveying system 300.

Individual items 190 are transported by the conveying system 300 (FIG. 3) on individual shuttles 320 to the order sortation system 200. The individual items 190 are inducted into the order sortation system 200 by an automatic system such as a pick-and-place, a robot, tilt tray, or any other type of suitable automated mechanisms. In some embodiments, individual items 190 can be inducted into the order sortation system 200 by a worker.

The induction system 210 can determine the identity of each of the unsorted items 190 individually (e.g., using a bar code scanner, RFID reader, visually, etc.). From there, as described further below, the order sortation system 200 can perform the task of automatically sorting the inducted items into the proper combinations of items to fulfill the individual orders being processed, resulting in completed individual orders contained in respective individual receptacles in a matrix of receptacle stations 220.

For example, a first order being processed by the order sortation system 200 may be for a quantity of two of item A and one of item B. A second order being processed by the order sortation system 200 may be for a quantity of four of item B and two of item C. A third order being processed by the order sortation system 200 may be for a quantity of two of item A, one of item B, and one of item C. In total then, the three orders require four of item A, six of item B, and three of item C. Accordingly, in this example the unsorted items 190 would include, at least, four of item A, six of item B, and three of item C. After the induction of the unsorted items 190 into the order sortation system 200 on an individual item-by-item basis via the induction system 210, the order sortation system 200 will singularly automatically transport all of the items for the first order to a first receptacle in the matrix of receptacle stations 220, singularly automatically transport all of the items for the second order to a second receptacle in the matrix of receptacle stations 220, and singularly automatically transport all of the items for the third order to a third receptacle in the matrix of receptacle stations 220. Accordingly, when the order sortation system 200 is finished sorting the three orders, the first receptacle will contain two of item A and one of item B (as per the first order), the second receptacle will contain four of item B and two of item C (as per the second order), and the third receptacle will contain two of item A, one of item B, and one of item C (as per the third order).

When the sortation of an individual order has been completed (such that a receptacle contains all of the items for the individual order) the order sortation system 200 will notify a worker 10 attending to the matrix of receptacle stations 220 so that the worker 10 can move the ordered items from the receptacle to a next operation (e.g., to a packaging operation in preparation for shipping the order). In some cases, the order sortation system 200 will utilize signal lights to notify the worker 10 when a receptacle contains all of the items for the individual order. In response, in some cases the worker 10 will simply remove the receptacle containing the items from the matrix of receptacle stations 220 and then transfer the items from the receptacle to a box for shipment. The worker 10 can then replace the receptacle back into an open receptacle station of the matrix of receptacle stations 220.

FIG. 4 shows a bird's eye perspective view of the example order sortation system 200. From the depicted view it is apparent that, in addition to the induction system 210 and the matrix of receptacle stations 220 described above, the example order sortation system 200 includes an item transportation system 230 and a second matrix of receptacle stations 240. In other words, the order sortation system 200 includes a first matrix of receptacle stations 220 and a second matrix of receptacle stations 240 that are back-to-back. Workers 10 attend to each of the first matrix of receptacle stations 220 and the second matrix of receptacle stations 240 respectively.

The first matrix of receptacle stations 220 and the second matrix of receptacle stations 240 are arranged parallel to each other. The first matrix of receptacle stations 220 and the second matrix of receptacle stations 240 are separated by the item transportation system 230.

The item transportation system 230 includes a plurality of multi-directional item transport vehicles 232. Each of the item transport vehicles 232 is configured to travel along the automated order sortation system 200 and to autonomously transport singular items from the induction system 210 to the appropriate/assigned receptacle located in one of the positions of either the first matrix of receptacle stations 220 or the second matrix of receptacle stations 240. The item transport vehicles 232 are configured to autonomously transfer the item being carried into the appropriate/assigned receptacle. In some embodiments, after an item transport vehicle 232 has transferred into a receptacle the item it was carrying, then the item transport vehicle 232 will travel back to the induction system 210 along the lowest level of the item transportation system 230.

Figure 5:
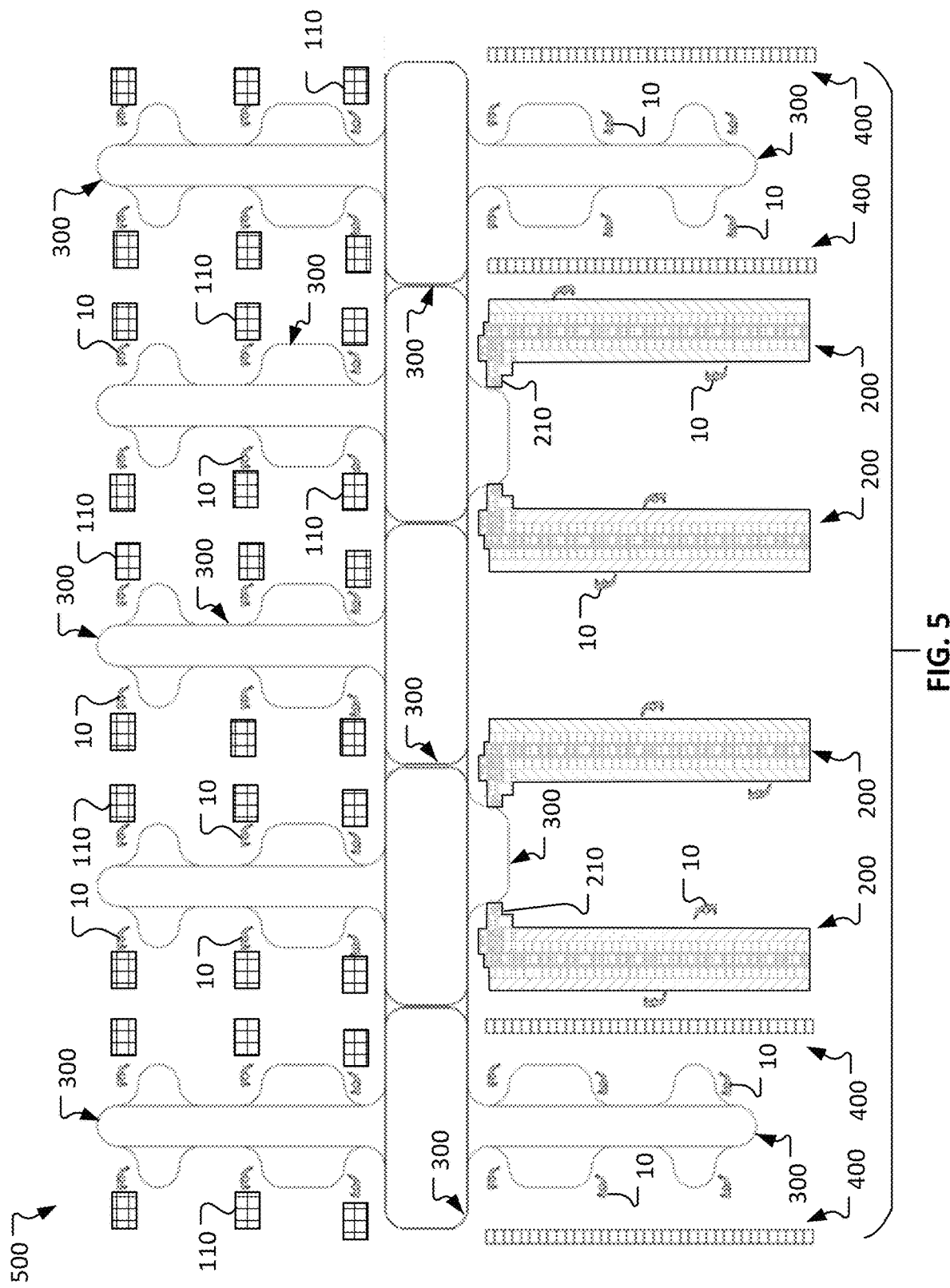
FIG. 5 is a schematic illustration of an example high-speed semi-automatic warehouse sorting system.

FIG. 5 schematically illustrates an overall warehouse order sortation system 500. The upper portion of FIG. 5 illustrates that the overall warehouse order sortation system 500 includes multiple decantation process and item conveying systems 300 (as described in reference to FIG. 3). These each include a workstation with a cage cart 110 and a worker 10 that is loading items 190 onto the conveying system 300.

The lower portion of FIG. 5 illustrates that the overall warehouse order sortation system 500 includes multiple final order sortation systems. In this example, the system 500 includes four back-to-back automatic order sortation systems 200 (as described in reference to FIG. 4) and four manual order sortation systems 400 (sometimes referred to as a "put wall system"). The conveyance system 300 connects the decantation workstations to the order sortation systems 200/400. While not shown, it should be understood that the overall warehouse order sortation system 500 includes and is controlled by one or more control systems (e.g., a control system for the conveying systems 300, an order fulfillment control system 180 (FIG. 1), and the like).

The depicted overall warehouse order sortation system 500 is simply one illustrative example of the types of order sortation systems that can be established using the innovative concepts described herein. That is, any number of decantation systems, final order sortation systems, and layout of the conveyance system 300 can be included, and all variations are within the scope of this disclosure.

It can be seen in FIG. 5 that the conveyance system 300 has multiple pathways, loops, parallel paths, branches, intersections, and the like. Accordingly, the conveyance system 300 is configured for item sortation and sequencing as described above. In addition, the multiple pathways, loops, parallel paths, branches, and the like facilitate movement of empty shuttles from the order sortation systems 200/400 to travel back to the decantation workstations without interfering with the travel of shuttles that are carrying items.

The items being decanted at the decanting workstations can be sent by the conveyance system 300 to any of the order sortation systems 200/400. For example, a first item that is decanted and placed onto a shuttle at a first workstation can travel via the conveyance system 300 to a first order sortation system 200/400. A second item that is decanted and placed onto a shuttle at the same first workstation can travel via the conveyance system 300 to a second, different order sortation system 200/400.

It should be understood that the overall warehouse order sortation system 500 is highly automatic (low human labor requirements), and high speed (e.g., in terms of a number of items sorted per hour). The use of the item conveying system 300 as part of the overall warehouse order sortation system 500 as described herein greatly increases throughput speed and reduces human labor requirements in comparison to conventional sortation techniques. Moreover, the conveying system 300 is automatic, modular, configurable, scalable/expandable, and flexible.

Figure 6:
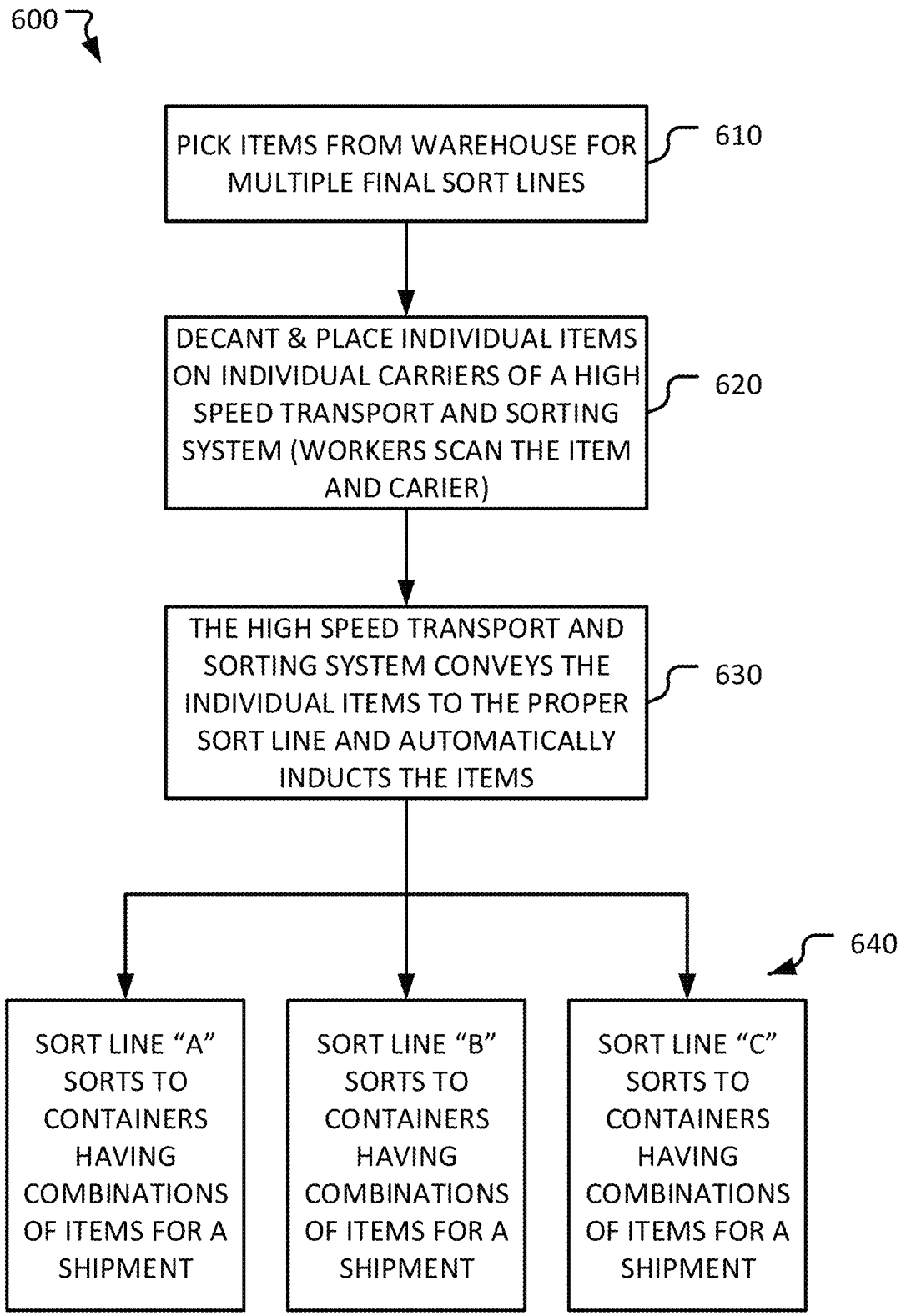
FIG. 6 is a flowchart of an example method for operating a high-speed semi-automatic warehouse sorting system.

FIG. 6 is a flowchart of an example method 600 for operating a high-speed semi-automatic warehouse sorting system (such as the overall warehouse order sortation system 500 described above, and the overall warehouse order sortation system 800 described below). The method 600 is one illustrative example of how the order sortation 160 (FIG. 1) can be executed for fulfilling orders 120 that each include any number of one or more particular items. The method 600 can be used for sorting items for any type of order 120 including, but not limited to, direct-to-customer shipments, store replenishment orders, customer pick-up-at-store orders, forward deployment of inventory shipments, inventory transfers, and the like.

In operation 610, items are picked from an inventory storage area in accordance with orders issued from an order fulfillment control system (such as the order fulfillment control system 180 described above). In some cases, this operation can be performed, for example, as described in reference to FIG. 2. Such warehouse orders to be picked are often released/processed in waves over time periods of hours, shifts, days, or volume and/or other windows.

The items picked (or retrieved, received, etc.) from inventory storage will be ultimately sorted by one or more final sort lines. That is, in some circumstances, an individual cage cart 110 can concurrently contain one or more items that will be sorted by a first final sort line and one or more that will be sorted by a second final sort line. That mixture of items for sortation by differing final sort lines will be automatically sorted and/or sequenced by the conveyance system as described herein.

In operation 620, items that were picked from inventory storage are decanted by workers and placed onto the carriers (e.g., shuttles) of the conveyance system (e.g., the conveyance system 300 described above, or the conveyance system 700 described below). In some embodiments, this operation can be performed as described above in reference to FIG. 3. The workers can scan the barcodes of the item and the shuttle on which the item is placed. The control system(s) can then marry the type of item (e.g., an identifier of the item) to the particular shuttle that is transporting the item. That way the control system(s) knows what item is on each shuttle that is in use.

In operation 630, the conveyance system (e.g., the conveyance system 300 described above, or the conveyance system 700 described below) transports the individual items to a designated final sort line for each of the items. That process of transporting individual items to designated final sort lines is a sortation process that is performed by the conveyance system. This operation 630 is also described above in reference to FIGS. 3 and 5, for example. When the individual items reach the location of the designated final sort line for each of the items, the items are automatically inducted into the final sort line (e.g., if the final sort line is an automatic sortation system, such as depicted in FIG. 4).

In operation 640, the final sort lines perform the final sortation of items to fulfill customer orders. This can be an automatic sort process (e.g., as described in reference to FIGS. 4, 5, and 8) or a manual sort process (e.g., as described in reference to FIGS. 5 and 8). The end result is the aggregation of the proper items in the proper quantities as per the customer orders.

Figure 7:
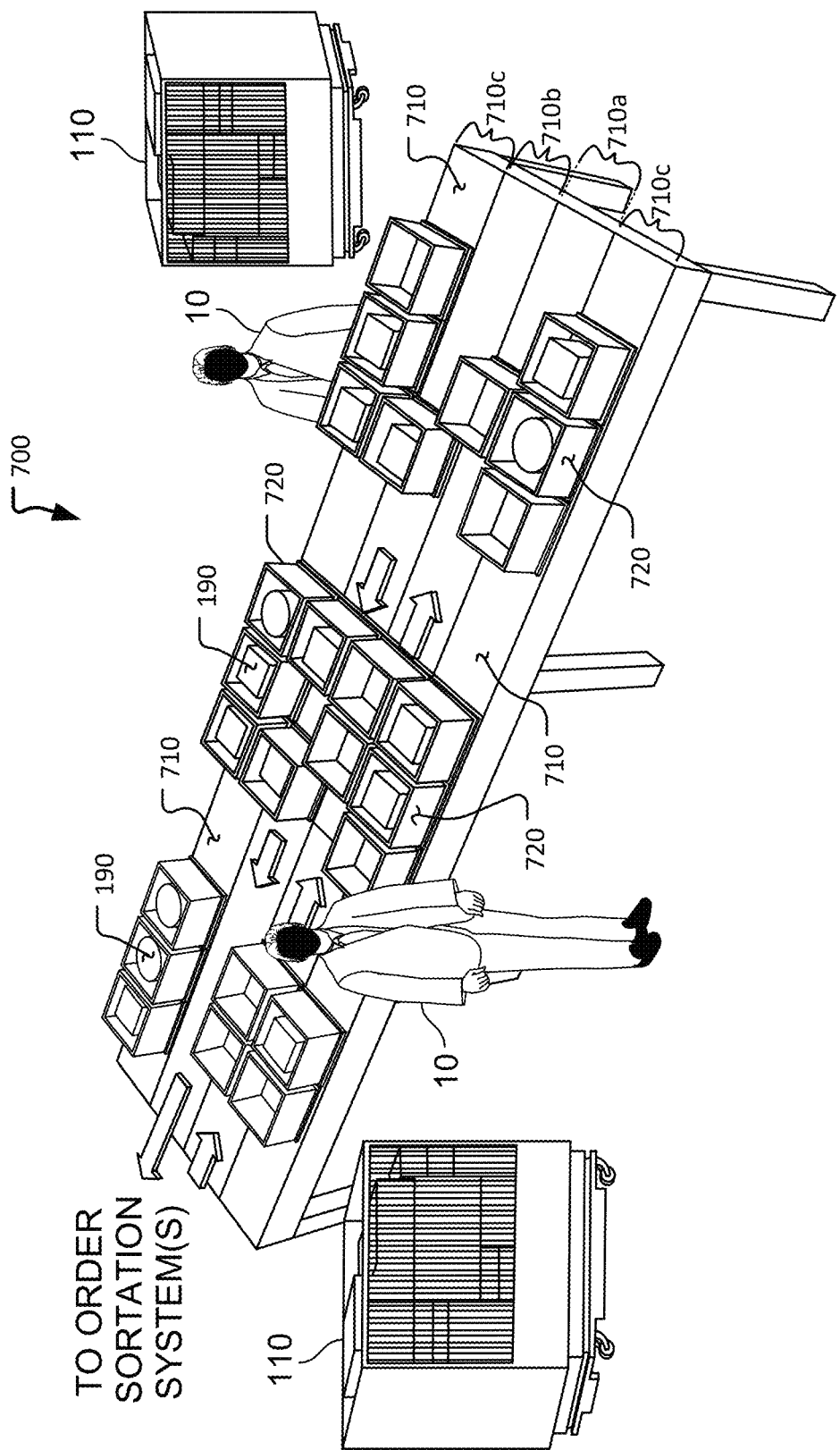
FIG. 7 is a perspective view of another example decanting and high speed item sorting and conveying system.

FIG. 7 depicts an example decantation process and item sorting and conveying system 700 (or simply "conveying system 700" hereafter). The cage carts 110 from the order picking process (as described above in reference to FIG. 2) can be delivered here and staged for decantation (e.g., the input of individual items or saleable units from the cage carts 110 onto the conveying system 700). In some cases, the items from the order picking process are pre-sorted prior to arrival at the conveying system 700. For example, in some cases the items from the order picking process can be pre-sorted in accordance with factors such as, but not limited to, weight, size, destination (internal and/or external), and so on. Such a pre-sort process can be manual, semi-automatic, or automatic.

The conveying system 700 includes a surface 710 and a plurality of shuttles 720 that travel along the surface 710 in an individualized controlled manner, while carrying items 190 (or while being empty of items 190). In the depicted embodiment, each shuttle 720 carries a single item 190 (or a groupings of items 190). In some cases, two or more shuttles 720 (e.g., two shuttles 720, three shuttles 720, four shuttles 720, etc.) can be ganged together to operate unitarily so that the ganged shuttles 720 can transport larger and/or heavier single items 190 than what a single shuttle 720 can transport. While the shuttles 720 are depicted as being bins with open tops, other configurations of the shuttles 720 are possible (e.g., flat platform surfaces, boxes, tilt-able carriers, etc.)

The conveying system 700 uses magnetic levitation for transporting the shuttles 720 along the surface. In other words, the shuttles 720 (and the items 190 being carried) "float" above the top of the surface 710, and thereby travel along the surface 710 without friction.

Just under the top of the surface 710 are multiple electromagnetic motor segments that each generate and emit an individually controllable electromagnetic field. The characteristics of the electromagnetic field generated by individual electromagnetic motor segments of the multiple electromagnetic motor segments can be controlled to create localized dynamic (or static) electromagnetic emissions that have a localized effect on individual shuttles 720 on the surface 710.

The shuttles 720 can have one or more integrated permanent magnets. Accordingly, the magnetic field interactions between the permanent magnets of the shuttles 720 and the electromagnetic fields generated by the individual electromagnetic motor segments of the surface 710 can be harnessed to levitate the shuttles 720 above the top of the surface 710. Moreover, the electromagnetic fields generated by the individual electromagnetic motor segments of the surface 710 can be dynamically controlled to cause the shuttles 720 to travel along the surface 710 in any desired manner.

A control system of the conveying system 700 can control the movements of the individual shuttles 720 by controlling the characteristics of the electromagnetic fields generated by the individual electromagnetic motor segments of the surface 710. In such a manner, the individual shuttles 720 can be transported along various paths, in a controlled manner, to various predetermined "downstream" destinations (as described further below). Because the individual shuttles 720 can be transported to various prescribed destinations, it can be said that the conveying system 700 is a type of a sorting system that functions to sort the items 190.

The motion of each shuttle 720 is individually controlled by the control system of the conveying system 700 to navigate independently along the surface 710. Each shuttle 720 can be controlled to move along the x-axis and along the y-axis of the surface 710. Motions along the x-axis and along the y-axis can occur simultaneously, for creating arcuate motion paths. The shuttles 720 can also be individually controlled in the z-axis (the vertical float height). The shuttles 720 can also be individually controlled to spin or rotate, tilt, move in formation with two or more of the shuttles 720 "ganged" together, and so on. The shuttles 720 can be made in different sizes and made for different carrying capacities (payload capacities).

Each shuttle 720 has a unique ID that is continuously readable by the control system of the conveying system 700. Accordingly, the controller of the conveying system 700 always knows the precise, specific locations of each of the shuttles 720.

The control system of the conveying system 700 also knows the assigned destination of each of the shuttles 720 (as described further below). This assigned destination information for each of the shuttles depends on the type of item 190 being transported, and can be communicated to the control system of the conveying system 700 from the order fulfillment control system 180 (FIG. 1), for example. The controller of the conveying system 700 runs an algorithm that optimizes the paths and movements of all of the shuttles 720. This eliminate delays due to congestion of the shuttles 720 on the surface 710. The shuttles 720 are moved at a high rate of speed, and with smooth accelerations and decelerations.

Still referring to FIG. 7, the workers 10 transfer the items 190 from the cage carts 110 to the shuttles 720 on an individual item-by-item basis (this is decantation). That is, the workers 10 can load single items 190 (or a single saleable bundle of a multiple number of the items) onto/into single shuttles 720 (or onto multiple shuttles 720 that work together like a unitary shuttle 720). In some scenarios, the workers 10 will break a case of items 190 apart and place individual items 190 from the case onto single shuttles 720. In some scenarios, a case of the items 190 (or other bundle of multiple items 190) are placed onto single shuttles 720 without breaking the case apart.

In the depicted embodiment, the surface 710 has an inbound lane 710a that is used for the transport of empty shuttles 720, and outbound lane 710b for shuttles 720 that are transporting an item 190, and two loading zone lanes 710c where the workers 10 transfer the items 190 from the cage carts 110 into the shuttles 720. Empty shuttles 720 are controllably moved to one of the loading zone lanes 710c via the inbound lane 710a. Then, after an item 190 has been loaded onto a shuttle 720 by the worker 10 the shuttle 720 carrying the item 190 is controllably moved to the outbound lane 710b where it travels to a downstream process (as described further below).

After an item 190 has been loaded onto a shuttle 720 by the worker 10, the worker 10 can scan a barcode on the item 190 and a barcode on the shuttle 720 (each shuttle 720 has a unique identifier/barcode). In some cases, other types of identifiers can be used, such as RFID tags and the like, without limitation.

Using the scanned barcode data, the control system of the conveying system 700, or the order fulfillment control system 180 (or other type of control system) will map (or "marry") the item 190 to the shuttle 720 in which the item 190 is residing. Accordingly, a control system (e.g., the control system of the conveying system 700, the order fulfillment control system 180, or both) will know/trace what particular type of item 190 is on each particular shuttle 720. This information will be used by the control system to determine and control to which final sort line the items 190 will be automatically moved to via the shuttles 720 of the item conveying system 700, as described further herein.

Much more so than a typical warehouse conveying system, the conveying system 700 is a "smart" system. That is, the conveying system 700 (in conjunction with its control system(s)) has many automatic operational functionalities that are not typically found in a conventional conveyor system. First, the conveyance of the shuttles 720 along the surface 710 are discretely controlled and positionally tracked on an individual basis. In some embodiments, this is accomplished at least in part because the conveying system 700 comprises sensors. In such a case, localized segments of the surface 710 can be sequentially energized and controlled to create progressive electromagnetic fields that causes conveyance of an individual shuttle 720 along the surface 710 in the manner desired (e.g., at a desired acceleration, top speed, pathway, position, etc.). While the conveying system 700 includes multiple shuttles 720 moving along the surface 710 simultaneously, the movements (e.g., acceleration, speed, path, position, deceleration, spacing, etc.) of each of the shuttles 720 is controlled on an individual basis. In this manner, the conveying system 700 is a smart system, because each shuttle 720 is controlled in a highly individualized manner. In some cases, two or more of the shuttles 720 can be ganged together to operate jointly in a unified, individualized manner. This mode/manner can be especially useful for transporting large or heavy items 190 (or cases of items 190, and the like).

In some cases, the conveying system 700 can be used in conjunction with other, more conventional conveyor systems or other material handling systems. For example, long runs can be made from conventional conveyor systems that will tend to be lower cost than a long run of the electromagnetic design of the conveying system 700. Items can be transferred between the conveying system 700 and conventional conveyors using various systems such as, but not limited to, pick-and-place devices, robotic devices with vision systems, simple tilt trays, transfer belts, and the like, without limitation.

Also, it should be noted that the conveying system 700 is a high-speed system. The fact that the conveying system 700 comprises a system of electromagnetic generator segments allows the shuttles 720 (with the items 190 carried on the shuttles 720) to be moved with very rapid acceleration, top speed, and deceleration in a smooth and controlled manner. The movement parameters (e.g., acceleration, top speed, and deceleration) can be individualized for each shuttle 720, and can be dependent on the type of items 190 carried by the shuttles 720.

Second, the control system(s) of the item conveying system 700 stores data and refreshes the stored data such that the item conveying system 700 knows and controls the location of each shuttle 720 on the item conveying system 700 on an individualized basis. This can also be referred to as item "traceability." The control system of the item conveying system 700 tracks where on the item conveying system 700 each individual shuttle 720 is located whether the shuttle 720 is being moved or is being held stationary.

Third, the control system(s) of the item conveying system 700 (or another control system such as a warehouse management system) determines where along the item conveying system 700 that each of the unique shuttles 720 is to be directed (e.g., the path), and the designated final destination of each of the shuttles 720 (based on the item 190 being carried by the shuttle 720). The control system of the item conveying system 700 may communicate with one or more other systems (e.g., the order fulfillment control system 180) to obtain and/or determine such information. For example, as described further below, the overall order fulfillment system of the warehouse may include multiple final sortation systems. The control system of the item conveying system 700 is made aware of or determines which particular final sortation system of the multiple final sortation systems that each of the shuttles 720 is to be moved to (based on the item 190 being carried by the shuttle 720), and controls the movements of each of the shuttles 720 accordingly. In this manner, the item conveying system 700 can automatically sort items 190 (e.g., by moving certain items 190 to a first final sortation system and by moving other items 190 to a second final sortation system).

Fourth, the item conveying system 700 can intelligently sequence the movements and delivery timing/order of each of the shuttles 720 that are on the item conveying system 700 (based on the item 190 being carried by the shuttle 720). For example, in some cases certain items 190 may be designated as having a higher priority to reach the final destination (e.g., sortation system) prior to other lower priority items 190. This prioritization feature can also facilitate re-routing items 190 from a sortation system that is down to another sortation system that is running and requires the same specific items 190 to complete an order. In some embodiments, the control system of the item conveying system 700 may receive such information from the order fulfillment control system 180 (or another system). Because the surface 710 of the item conveying system 700 includes various alternate paths, the item conveying system 700 can temporarily buffer (hold in temporary storage) certain lower priority items 190 until the higher priority items 190 have been moved in front of the lower priority items 190. In this manner, the item conveying system 700 can automatically sequence items 190.

The fact that the surface 710 of the item conveying system 700 includes various alternate paths also provides an inherent redundancy in the event of a failure of a particular portion of the surface 710. For example, if a particular portion of the surface 710 is inoperable, the conveying system 700 can automatically identify a route for the items 190 to travel that bypasses the inoperable portion of the surface 710. Accordingly, downtime of the item conveying system 700 is minimized. Scheduled maintenance can also be performed on portions of the item conveying system 700 without entirely shutting down the item conveying system 700.

The conveying system 700 is configurable in essentially an infinite number of ways. That is, the surface 710 is scalable and can be shaped and/or configured in any desired manner. In the depicted arrangement, the surface 710 is rectangular and has a width that is suited to allow for four of the shuttles 720 to be arranged side by side. However, the surface 710, and/or portions thereof, can be narrower, wider, longer, shorter, and arranged in different patterns and shapes in addition to rectangular (e.g., arcuate, circular, diamond-shaped, triangular, etc.).

In accordance with the above description, it should be understood that the item conveying system 700 is an automatic sortation system, sequencing system, and conveyance system which is capable of operating at high speeds. The item conveying system 700 is scalable/expandable, configurable, flexible, modular, and automatic. The use of the item conveying system 700 as described herein greatly increases throughput speed and reduces human labor requirements in comparison to conventional techniques for decanting, binning, labeling, and so on. The throughput of the item conveying system 700 can also be selectively controlled by adjusting parameters of the item conveying system 700 such as, but not limited to, the speed of the shuttles 720, the number of shuttles 720, and the like.

Figure 8:
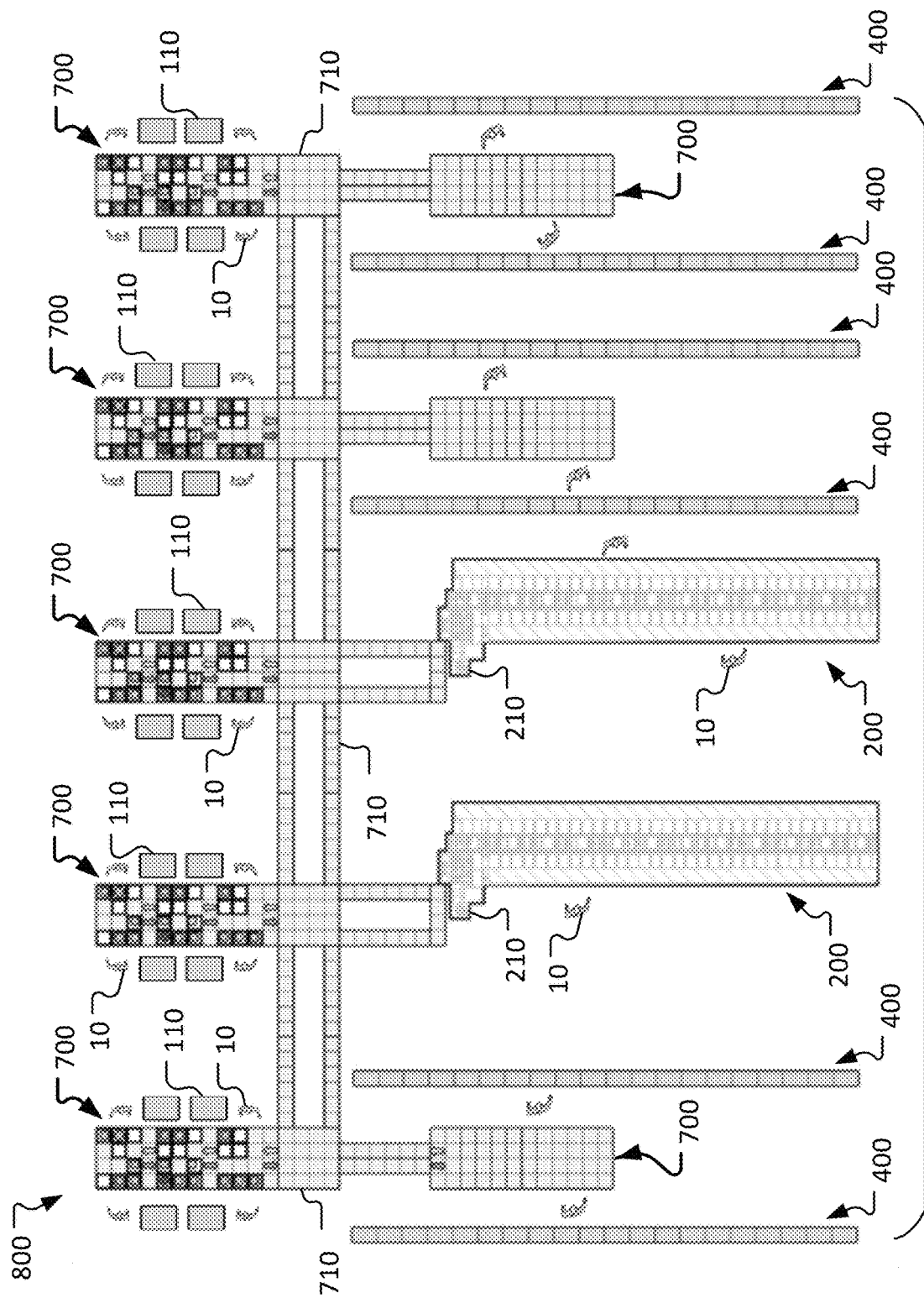
FIG. 8 is a schematic illustration of another example high-speed semi-automatic warehouse sorting system.

FIG. 8 schematically illustrates an overall warehouse order sortation system 800. The upper portion of FIG. 8 illustrates that the overall warehouse order sortation system 800 includes multiple decantation process and item conveying systems 700 (as described in reference to FIG. 7). These each include a workstation with a cage cart 110 and a worker 10 that is loading items 190 onto the conveying system 700.

The lower portion of FIG. 8 illustrates that the overall warehouse order sortation system 800 includes multiple final order sortation systems. In this example, the system 800 includes four back-to-back automatic order sortation systems 200 (as described in reference to FIG. 4) and six manual order sortation systems 400 (sometimes referred to as a "put wall system"). The conveyance system 700 connects the decantation workstations to the order sortation systems 200/400. While not shown, it should be understood that the overall warehouse order sortation system 800 includes and is controlled by one or more control systems (e.g., a control system for the conveying systems 700, an order fulfillment control system 180 (FIG. 1), and the like).

The depicted overall warehouse order sortation system 800 is simply one illustrative example of the types of order sortation systems that can be established using the innovative concepts described herein. That is, any number of decantation systems, final order sortation systems, and layout of the conveyance system 700 can be included, and all variations are within the scope of this disclosure.

It can be seen in FIG. 8 that the conveyance system 700 has multiple pathways, loops, parallel paths, branches, intersections, and the like. Accordingly, the conveyance system 700 is configured for item sortation and sequencing as described above. In addition, the multiple pathways, loops, parallel paths, branches, and the like facilitate movement of empty shuttles 720 from the order sortation systems 200/400 to travel back to the decantation workstations without interfering with the travel of shuttles 720 that are carrying items 190.

The items 190 being decanted at the decanting workstations can be sent by the conveyance system 700 to any of the order sortation systems 200/400. For example, a first item that is decanted and placed onto a shuttle 720 at a first workstation can travel via the conveyance system 700 to a first order sortation system 200/400. A second item that is decanted and placed onto a shuttle 720 at the same first workstation can travel via the conveyance system 700 to a second, different order sortation system 200/400.

It should be understood that the overall warehouse order sortation system 800 is highly automatic (low human labor requirements), and high speed (e.g., in terms of a number of items sorted per hour). The use of the item conveying system 700 as part of the overall warehouse order sortation system 800 as described herein greatly increases throughput speed and reduces human labor requirements in comparison to conventional sortation techniques. Moreover, the conveying system 700 is automatic, modular, configurable, scalable/expandable, and flexible.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A warehouse system for sorting items to fulfill orders, the system comprising:
   a conveyance system comprising:
      a plurality of shuttles configured to receive and transport individual items of the items;
      a plurality of manual decantation stations, each manual decantation station being configured for a worker to manually load the individual items directly onto individual shuttles of the plurality of shuttles; and
      a track defining a plurality of pathways along which the plurality of shuttles controllably travel, wherein each shuttle of the plurality of shuttles controllably travels along the pathways independently of all other shuttles of the plurality of shuttles;
   a first automated order sortation system arranged to receive at least some of the individual items and configured to aggregate the at least some of the individual items into one or more groups in accordance with the orders; and
   a control system in data communication with the conveyance system and the first automated order sortation system, wherein the control system is configured to send control signals to the conveyance system to cause each shuttle of the plurality of shuttles to travel along the plurality of pathways in a manner based on a type of individual item of the items that each shuttle of the plurality of shuttles is transporting,
   wherein two or more shuttles of the plurality of shuttles can be ganged together to operate jointly in a unified manner to transport large or heavy individual items of the items.

2. The system of claim 1, further comprising a second automated order sortation system arranged to receive at least some of the individual items and configured to aggregate the at least some of the individual items into one or more groups in accordance with the orders.

3. The system of claim 2, wherein the control system is configured to send control signals to the conveyance system to cause a first shuttle of the plurality of shuttles to travel along the pathways to the first automated order sortation system because the first shuttle is transporting a first item that is allocated for a first order that the first automated order sortation system is assigned to fulfill.

4. The system of claim 3, wherein the control system is configured to send control signals to the conveyance system to cause a second shuttle of the plurality of shuttles to travel along the pathways to the second automated order sortation system because the second shuttle is transporting a second item that is allocated for a second order that the second automated order sortation system is assigned to fulfill.

5. The system of claim 4, further comprising a manual order sortation system arranged to receive at least some of the individual items and configured for manual aggregation of the at least some of the individual items into one or more groups in accordance with the orders.

6. The system of claim 5, wherein the control system is configured to send control signals to the conveyance system to cause a third shuttle of the plurality of shuttles to travel along the pathways to the manual order sortation system because the third shuttle is transporting a third item that is allocated for a third order that the manual order sortation system is assigned to fulfill.

7. The system of claim 1, wherein the control system comprises: (i) an order fulfillment control system and (ii) a control system of the conveyance system.

8. The system of claim 1, wherein the manner based on the type of individual item of the items that each shuttle of the plurality of shuttles is transporting comprises a particular pathway of the plurality of pathways.

9. The system of claim 8, wherein the manner based on the type of individual item of the items that each shuttle of the plurality of shuttles is transporting further comprises a temporary stoppage of travel in order to sequence the items based on the orders.

10. The system of claim 1, wherein the track comprises a linear servomotor.

11. The system of claim 10, wherein the conveyance system further comprises sensors or encoders arranged along the pathway and configured to detect respective positions along the pathway of each shuttle of the plurality of shuttles.

12. The system of claim 11, wherein the control system is configured to receive signals output from the sensors or encoders and to determine the respective positions along the pathway of each shuttle of the plurality of shuttles based on the signals.

13. The system of claim 1, further comprising an automated system for automatically transferring the least some of the individual items to the first automated order sortation system from the conveyance system.

14. A method of sorting items to fulfill orders, the method comprising:

picking or retrieving, from inventory storage, a plurality of items that are allocated for a plurality of orders; and decanting, by a plurality of workers at a plurality of manual decantation stations, the plurality of items and placing individual items of the plurality of items directly onto individual shuttles of a conveyance system that includes a plurality of shuttles, wherein the individual items are individually assigned a priority, wherein the individual shuttles that are transporting lower priority items of the plurality of items are held in a temporary buffer storage portion of the conveyance system until the individual shuttles that are transporting higher priority items of the plurality of items are moved ahead of the individual shuttles that are transporting the lower priority items, and wherein the individual shuttles transport respective individual items to a particular final order sortation system of a plurality of final order sortation systems because the particular final order sortation system is processing one or more orders that include the respective individual items.

15. The method of claim 14, wherein the respective individual items are automatically transferred to the particular final order sortation system.

16. The method of claim 14, wherein the individual shuttles controllably travel along the pathways independently of all other shuttles of the plurality of shuttles.

17. The method of claim 16, wherein the individual shuttles controllably travel along the pathways in accordance with a unique pattern of motion in comparison to all other shuttles of the plurality of shuttles.

18. The method of claim 17, wherein the unique pattern of motion comprises a pattern of starting and stopping motion.

19. The method of claim 17, wherein the unique pattern of motion comprises an acceleration and deceleration profile.

20. The method of claim 14, wherein the plurality of final order sortation systems comprises at least one automated order sortation system and at least one manual order sortation system.

* * * * *